United States Patent [19]

Hayashida et al.

[11] Patent Number: 4,558,265
[45] Date of Patent: Dec. 10, 1985

[54] METHOD AND APPARATUS FOR POSITION CONTROL OF AN ELECTRIC MOTOR

[75] Inventors: Hiroshi Hayashida, Mito; Tadashi Takahashi; Kunio Miyashita, both of Hitachi, all of Japan

[73] Assignee: Hitachi, Ltd., Tokyo, Japan

[21] Appl. No.: 471,434

[22] Filed: Mar. 2, 1983

[30] Foreign Application Priority Data

Mar. 3, 1982 [JP] Japan ............................ 57-32363

[51] Int. Cl.$^4$ ............................................. G05B 13/00
[52] U.S. Cl. ...................................... 318/561; 318/618; 318/602
[58] Field of Search ............... 318/561, 618, 617, 602, 318/611, 367

[56] References Cited

U.S. PATENT DOCUMENTS 3,995,204 11/1976 Konrad et al. ...................... 318/373
4,473,786 9/1984 Miyashita et al. .................. 318/561

Primary Examiner—William M. Shoop, Jr.
Assistant Examiner—Saul M. Bergmann
Attorney, Agent, or Firm—Antonelli, Terry & Wands

[57] ABSTRACT

A control process and apparatus for positioning an electric motor provided with a rotation angle detector at a designated position positively at a high speed without being accompanied with hunting notwithstanding variation in the motor current and inertia of a load. The control process activated upon starting of the motor and ending at the stoppage of the motor at the designated position includes a first control region in which acceleration of the motor having been started is detected and subsequently a constant speed operation of the motor is effected at a maximum speed. A deceleration initiating time point is determined in dependence on the acceleration. A second control region is provided in which the motor is decelerated in accordance with a deceleration pattern determined in dependence on a rotation angle extending between a position corresponding to the deceleration initiating time point and the commanded stop position, and motor torque and inertia of load is detected at the deceleration initiating time point. During a third control region the motor is progressively decelerated by reducing correspondingly the gain of voltage (current) applied to the motor when the motor position approaches to the commanded stop position. The control process also includes a fourth control region in which, when the motor stops short of or beyond the commanded position, the duty ratio of voltage applied to the motor is progressively increased to thereby re-start the motor toward the commanded position, and a fifth control region in which the motor is held at the commanded stop position.

6 Claims, 30 Drawing Figures

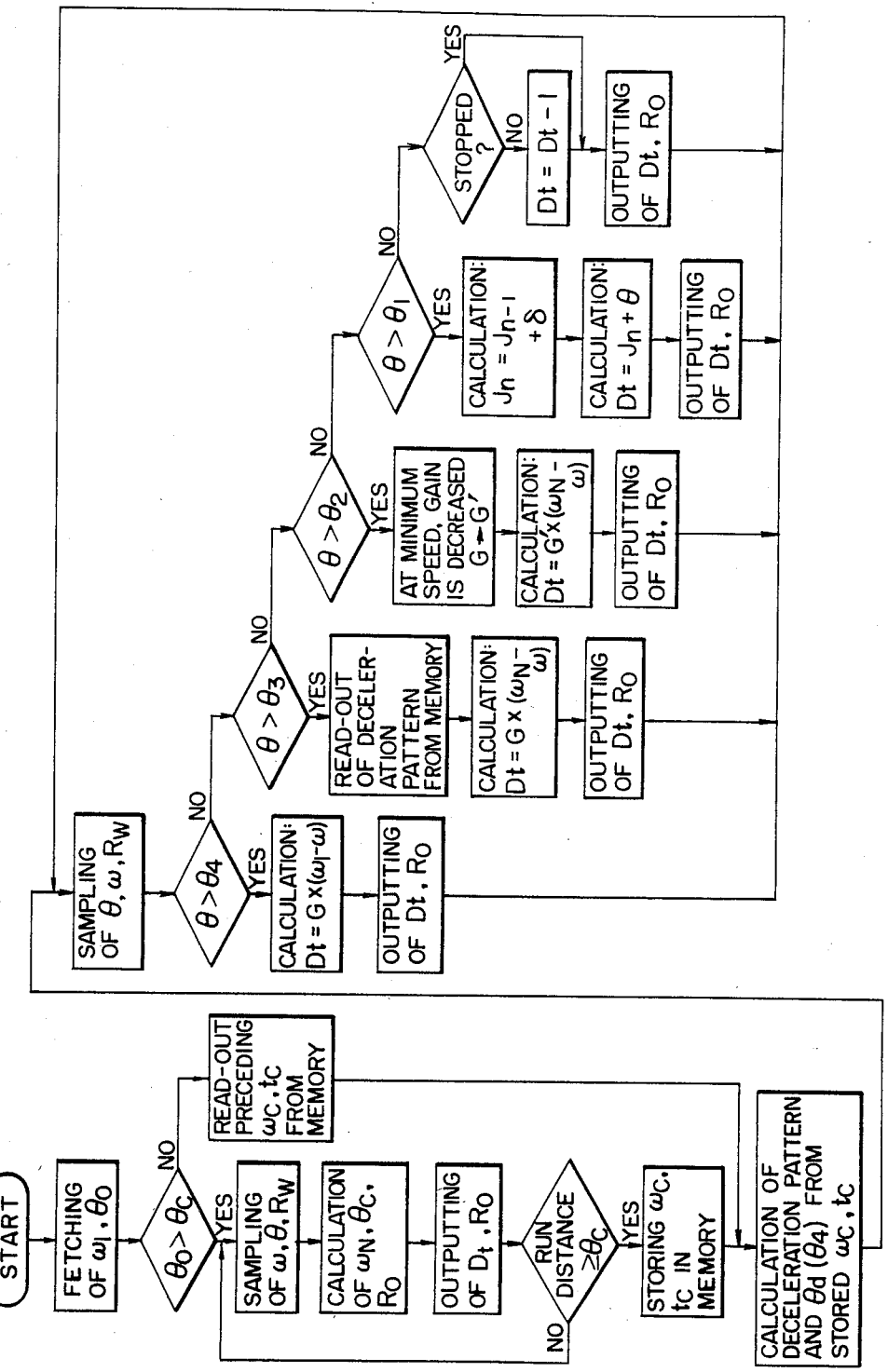

METHOD AND APPARATUS FOR POSITION CONTROL OF AN ELECTRIC MOTOR

The present invention generally relates to method and apparatus for controlling an electric motor. More particularly, the present invention concerns a speed control and a positioning control for optimally controlling the motor in consideration of inertia and a revolution on rotation speed of the motor with the aid of a rotation angle detector for detecting a rotation angle (run distance or angular displacement) of a rotating shaft of the motor or a rotating shaft which constitutes a part of a power transmission path for operatively coupling the motor shaft to a load, and a control circuit including switching circuitry for rotating the motor at a controllable speed in dependence on data derived from the output signal of the rotation angle detector.

Prior examples of motors which are caused to rotate for a predetermined angle under the control of a signal derived from the output of a rotation angle detector are step-motors and motors provided with a clutch/brake system.

The step-motor has an advantage in that angular displacement of the rotor or the output shaft or a member coupled thereto can be definitely accomplished in correspondence with the number of step pulses input to the motor. However, the step-motor is disadvantageous in that difficulty is encountered in realizing a small size motor which is neverthless capable of producing a large torque and in that high-speed response capability is poor. On the other hand, the motor provided with the clutch/brake system is widely adopted in the field of industrial sewing machines and enjoys a high-speed response, but suffers such drawbacks that offensive noise is generated upon operation of the clutch and the brake, not to speak of high susceptibility to abrasion.

Such being the circumstance, it is contemplated to realize a driving system which can be implemented in a small size, generate a great torque and exhibit a high-speed response by using a direct current or DC motor provided with a rotation angle detector on the output shaft of the motor or in a power transmission path extending to a load. In this case, the member which plays an important role in controlling the positioning of the motor is a control circuit which can perform a switching operation in dependence on the signal derived from the output of the rotation angle detector to apply a voltage of variable magnitude in a forward or reverse (backward) running direction.

On the other hand, the motor must be capable of driving a variety of loads inclusive of information or data processing apparatus, robots and the like, which means that the moment of inertia of the motor shaft as well as load torque varies correspondingly extensively. In this connection, there have heretofore been proposed various procedures for positioning load or apparatus differing from one another in respect of the moment of inertia and others at a desired position without being accompanied with the hunting or fluctuations. An example of such position control systems is disclosed in British Pat. No. 1,418,194. The control system of this patent is so arranged that the gain of an apparatus for energizing a motor is increased when the motor is rotated in such a direction that the actual motor position is moved away from a stop/lock command (target or desired) position rather than when the motor is so rotated that the actual motor position approaches to the desired or target position. The position control system disclosed in the above British Patent can certainly bring about the desired effects, owing to the positioning control among a series of processes or operations included from the start of the motor to the stopping thereof at the commanded position. However, in order to realize the precise positioning control at a high speed without involving hunting, an effective control process or region has to be additionally included in the series of the control processes. It should further be added that even in the positioning region taught by the British Patent, the hunting phenomenon is likely to occur as the motor position begins to approach the target or commanded position, because the gain of the motor energizing circuit is held constant independent of the distance between the actual motor position and the commanded stop position.

It is a primary object of the present invention to provide a motor control method which allows the positive and precise positioning to be attained without any noticeable hunting in spite of variation in inertia of the load and the current supplied to the motor.

A second object of the present invention is to provide a motor control apparatus which is capable of holding the motor positively at a position designated by a positioning command by overcoming the inherent cogging torque of the motor.

A third object of the present invention is to provide a motor control method and apparatus which are so arranged as to re-start a motor when it is stopped at a position other than the one designated by the positioning command, to thereby move the motor to the commanded position without fail.

According to a feature of the present invention, a voltage (current) of optimal magnitude and direction is applied to the motor in the course of a speed control process, which voltage is appropriately determined in dependence on the distance between the current or instant (actual) angular position of the motor and the commanded stop position and inertia of the control system.

According to another aspect of the invention, a decelerating process or phase activated upon initiation of deceleration in response to a decelerating command and ending upon stoppage at the commanded position is divided into a plurality of regions, wherein the voltage of optimal magnitude and direction is applied to the motor at each of the divided regions.

The above and other objects, features and advantages of the present invention will become more apparent from the description concerning the principle and preferred embodiments of the invention. The description makes reference to the drawings in which:

FIG. 18 shows a flow chart for illustrating operations of the position control apparatus shown in FIG. 8;

Figure 1A:
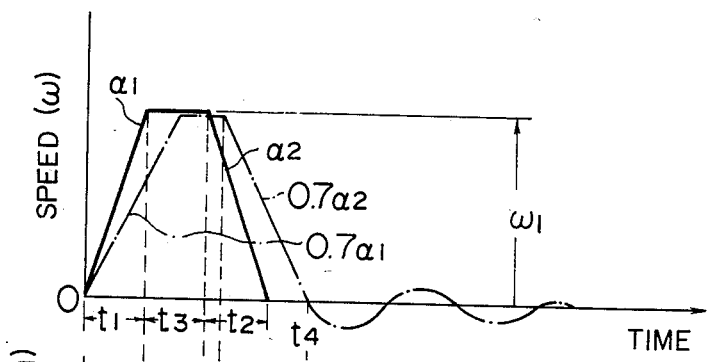
FIGS. 1a, 1b and 1c are views for graphically illustrating deceleration of a motor which is to be stopped at a commanded position.

The fundamental objective of the present invention is to realize the position control of a motor with the hunting suppressed to a possible minimum independent of variations in the current supplied to the motor or inertia of load. Before entering into description of the preferred embodiments, the basic technical concept and the gist of the present invention will first be made clear below.

In the first place, consideration is given to various factors which are related to the position control of a motor having a rotatable shaft provided with a rotation angle detector for measuring the angular position or angle of rotation of the motor shaft.

As a first factor (a), a positioning command value $\theta_0$ (rad) may be mentioned. This value defines a desired or target angular position to which the motor is to be driven for a predetermined angle in the forward or backward (reverse) direction from a given angular position of the motor.

Although the command value $\theta_0$ rarely if ever exceeds a single complete rotation of the motor shaft in the case of a motor provided with a clutch brake system which is ordinarily used in sewing machines or the like, it is not rare in some applications such as the motor for a printer, for example, that the positioning command $\theta_0$ takes a value of the order of 1800° which corresponds to several complete rotations of the motor shaft.

Another factor (b) to be considered is the number of pulses P generated for a single rotation of the motor by rotation angle detector directly coupled to the motor shaft. As will be apparent, the greater this pulse number P is, the higher resolution can be attained for the feed angle which is selected upon the position control (i.e. the number of feed steps or increments can be correspondingly increased). A positioning command value $\theta_{0P}$ which represents the positioning command value $\theta_0$ mentioned above in terms of the pulse number P is expressed as follows:

$$\theta_{0P} = \theta_0 \times P/2\pi \text{(pulses)} \tag{1}$$

Another factor (c) to be mentioned is torque generated by the motor, i.e. motor torque $T_M$(kg-m) which is given by the following expression:

$$T_M = K_t \times I_M \tag{2}$$

where $K_t$ represents a motor torque constant (kg-m/A) and $I_M$ is a motor current (A).

The torque constant $K_t$ is a value inherent to the motor in concern and given by $$K_t = K_1 \times N_1 \times \phi \tag{3}$$

where $K_1$ is a constant, $N_1$ represents the number of winding conductors and $\phi$ represents magnetic flux (wb) of the motor.

In this conjunction, it is noted that most of the motors finding application in data processing machines are of small capacity type not exceeding several hundred watts, among which permanent magnet motors are predominant.

In the permanent magnet motor, the magnetic flux $\phi$ mentioned above is generated by a permanent magnet and undergoes therefore variations in dependence on temperature. In the case of a ferrite magnet, the temperature coefficient is $-0.2\%/°C$. Accordingly, when the temperature changes, for example, from $-20°$ C. to $80°$ C., the magnetic flux varies about 20%.

The motor current $I_M$ is expressed by $$I_M = \frac{E - E_0}{R} \text{ (amperes or } A\text{)} \tag{4}$$

where E represents the voltage (volts or V) applied across the motor, which voltage is supplied through a control circuit incorporating a switching circuitry. This voltage E is given by the following expression:

$$E = D_t \times E_{dc} \tag{5}$$

where $D_t$ represents the duty ratio controlled by the switching circuitry and $E_{dc}$ represents a power source voltage (V). The duty ratio, also referred to hereinafter simply as the duty, is defined as the ratio of the voltage applied to the motor to a full or rated voltage thereof.

Further, $E_0$ in the expression (4) represents the voltage (V) induced in the motor and is given by the following expression:

$$E_0 = K_2 \times \omega \times N_1 \times \phi \tag{6}$$

where $K_2$ is a constant, $\omega$ represents the revolution or rotation number, i.e. rotating rate (speed) (rad/sec) of the motor, and $N_1$ and $\phi$ represent the number of winding conductors and the magnetic flux of the motor, respectively.

The denominator R in the expression (4) represents a sum resistance of an armature resistance $R_a$ of the motor and a wiring resistance $R_x$ of the current path extending from the control circuit to the motor. The armature resistance $R_a$ undergoes variation as a function of the temperature at which the motor is operated.

Another important factor (d) to be considered is moments of inertia of the motor and a load driven by the motor.

The moment of inertia J (kg-m.sec$^2$) of the motor shaft is given by $$J = J_M + J_L \tag{7}$$

where $J_M$ represents the moment of inertia of the motor, and $J_L$ represents the moment of inertia of the load coupled to the motor shaft in terms of the moment of inertia of the motor shaft.

A factor (e) next to be taken into consideration in conjunction with the load is a load torque $T_L$. It should be noted that difference between the load torque $T_L$ and the motor torque $T_M$ given by the aforementioned expression (2) represents an accelerating torque $T_1$ which accelerates the rotation of the motor shaft. Namely, the accelerating torque $T_1$ is given as follows:

$$T_1 = T_M - T_L \tag{8}$$

On the other hand, decelerating torque $T_2$ appearing upon deceleration of the motor is given by the following expression (9) in consideration of the fact that the start torque is of the same direction as the load torque.

$$T_2 = T_M + T_L \tag{9}$$

Another important factor (f) to be taken into account is a maximum permissible speed $\omega_{1-1}$ of a system driven by the motor. A maximum speed or number of rotation $\omega_m$ of the motor can be attained when the voltage $E_0$ given by the expression (6) is set to a maximum control voltage $E_m$. However, in most practical applications, the maximum speed $\omega_{1-1}$ permissible for the load system is usually lower than the maximum rotation number of the motor. In reality, the maximum speed $\omega_{1-1}$ is so selected as to satisfy the operational requirements imposed on the system, while assuring a high fidelity and durability, and determined in dependence on the mechanism or structure and the operation of the associated load system. Accordingly, the maximum speed $\omega_{1-1}$ of one and the same motor will vary in dependence on the systems with which the motor is actually used.

Finally, acceleration $\alpha_1$ and deceleration $\alpha_2$ which are important factors (g) involved in accleration and deceleration of the motor are given by the following expressions:

$$\alpha_1 = \frac{T_M - J_L}{J_M + J_L} = \frac{T_1}{J} \tag{10}$$

$$\alpha_2 = \frac{T_M + T_L}{J_M + J_L} = \frac{T_2}{J} \tag{11}$$

It will now be appreciated that the factors (a), (b), (c), (d), (e), (f) and (g) mentioned above play important roles in the position or positioning control of the motor.

In the following, a motor position control through which a desired or target position of the motor is attained by controlling the motor speed will be described with reference to the above mentioned various factors.

A given motor position or angular displacement $\theta$ may be expressed in terms of the motor speed (rad/sec) as follows:

$$\theta = \int_0^t \omega dt \tag{12}$$

In other words, the position $\theta$ is a time integral of the speed $\omega$.

In the motor control through which the motor shaft is moved to a position designated by the positioning command value $\theta_0$, the motor is first accelerated starting from the rest state to the motor speed (command value) $\omega_1$ (rad/sec) which corresponds to the maximum rotation number, and the acceleration $\alpha_1$ is measured. In this connection, it is assumed that the commanded motor speed $\omega_1$ does not exceeds the permissible maximum speed $\omega_{1-1}$ of the system driven by the motor, i.e. $\omega_1 \leq \omega_{1-1}$. Then, the speed $\omega$ which is determined in accordance with $\omega = \sqrt{\alpha \times \theta}$ (where $\theta$ represents the remaining angular distance for which the motor has to run to reach the commanded position) is compared with the maximum speed $\omega_1$, and the motor is decelerated from the maximum speed $\omega_1$ when the condition that $\omega < \omega_1$ is met.

Figure 1B:
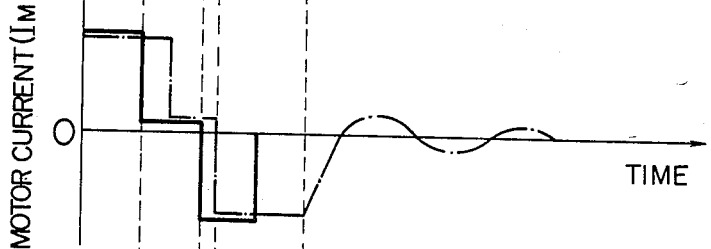
Figure 1C:
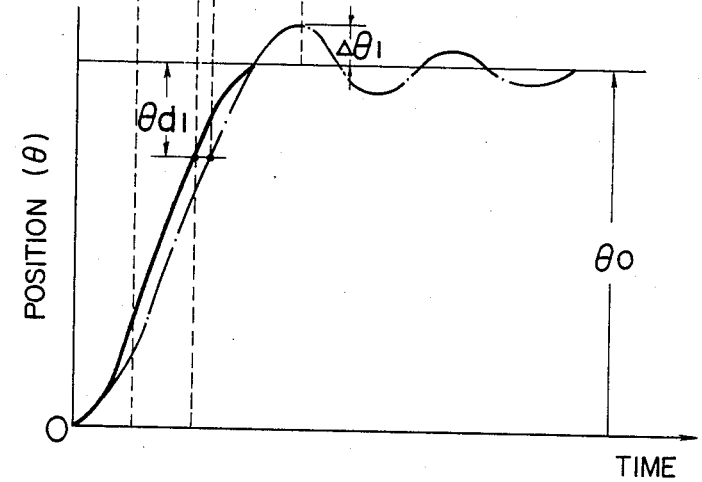

Details of the speed control briefed above is illustrated in FIGS. 1a, 1b and 1c which graphically show variations or transitions in the motor speed $\omega$, the motor current $I_M$ and the position $\theta$ of the motor, respectively. In these figures, solid line curves represent a first ideal case in which the system, the motor and the control circuit are properly matched with one another. It will be seen that the motor control is effected smoothly, involving no hunting nor fluctuations at the time the motor is stopped. On the other hand, single-dot broken line curves represent an undesirable case where the same motor as the one used in the first case is employed in combination with a system different from the one employed in the first case and/or where the voltage applied through the control circuit is different from the first case. In other words, the motor, the system and the control circuit are mismatched, resulting in appearance of the hunting phenomena or fluctuations.

In the first place, the first ideal speed control represented by the solid line curves in FIGS. 1a, 1b and 1c will be elucidated.

Referring to FIG. 1a, $t_1$ is a time required for accelerating the motor up to the maximum speed $\omega_1$ corresponding to the maximum rotation number, $t_2$ is a time taken for decelerating the motor from the maximum speed $\omega_1$ to zero speed, and $t_3$ is a period during which the motor is operated at the constant speed corresponding to the maximum speed $\omega_1$.

Referring to FIG. 1b, the motor current $I_M$ assumes a same magnitude of opposite polarities in the accelerating and the decelerating phases. It will further be noted that the motor current $I_M$ is of an extremely small value during the constant speed period $t_3$ as compared with the motor current in both the accelerating phase and the decelerating phase.

Referring to FIG. 1c, it will be seen that the position $\theta$ of the motor varies parabolically in the accelerating phase, linearly during the constant speed operation and exponentially in the decelerating phase before being indexed at the commanded position $\theta_0$.

The motor speed $\omega$ at the start of the deceleration is given by $\omega = \sqrt{\alpha \times \theta_{d1}}$ where $\theta_{d1}$ represents the remaining distance over which the motor has to run in the decelerating phase. Through regulation or adjustment made previously, the position $\theta$ of the motor at the time the motor speed is decreased to zero will substantially coincide with the commanded position $\theta_0$, i.e. the difference between the zero speed position $\theta$ and the commanded position $\theta_0$ will become zero. In this way, the motor can be smoothly stopped through the stopping routine without being accompanied with the hunting.

On the contrary, in the second case represented by the single-dot broken line curves in FIGS. 1a, 1b and 1c, the acceleration in the accelerating phase and the deceleration in the decelerating phase are assumed to be lower by 30% than those in the first case illustrated by the solid line curves. This means that the values calculated in accordance with the expressions (10) and (11) mentioned hereinbefore are decreased about 30% for the reason that the same motor as the one used in the first case is combined with another system and/or that the source voltage supplied through the control circuit is different. On these conditions, the time taken for the acceleration is increased about 30% as compared with the first case represented by the solid line curves. After the constant speed rotation at the maximum speed, deceleration of the motor is started at the speed $\omega_1 \leq \sqrt{\alpha + \theta_{d1}}$ where $\theta_{d1}$ represents the remaining distance for which the motor is to run for reaching the commanded position $\theta_0$. Accordingly, at a time point $t_4$ at which the motor speed is reduced to zero, the motor position $\theta$ will overshoot the commanded position $\theta_0$ by $\Delta\theta_1$, which can be explained by the fact that the time of the duration of the decelerating phase is increased about 30% due to decrease of deceleration of 30% as compared with the ideal case represented by the solid line curves in FIGS. 1a to 1c, resulting in that the angular displacement of the motor in the decelerating phase exceeds the remaining distance $\theta_{d1}$ mentioned above. After the time point $t_4$, the motor rotation is repeatedly reversed several times in an effort to make zero the overshoot $\Delta\theta_1$ and finally stopped under the damping action of the control system and through the stopping control routine, thus giving rise to the hunting phenomenon.

In view of the foregoing, the present invention starts from the fact that the acceleration in the motor accelerating phase is in a fixed relationship with the deceleration in the motor decelerating phase. The position $\theta_{d1}$ relating to the residual distance for which the motor has to run in the decelerating phase to reach the commanded position is arithmetically determined on the basis of the measurement of the acceleration, while dividing the decelerating phase into an appropriate number of decelerating steps at each of which the deceleration is optimally regulated.

Describing in more detail, from the expressions (10) and (11), the relation between the deceleration $\alpha_2$ and the acceleration $\alpha_1$ is expressed as follows:

$$\alpha_2 = \frac{T_M + T_L}{T_M - T_L} \times \alpha_1 \tag{13}$$

Hence, the speed $\omega$ at which the deceleration of the motor is to be started for covering the residual distance can be determined in accordance with the following formula.

$$\omega = \omega_1 = \sqrt{2 \times \alpha_2 \times \theta_d} = 2 \times \alpha_1 \frac{T_M + T_L}{T_M - T_L} \theta_d \tag{14}$$

$$= 2\alpha_1 \times K_{ad} \times \theta_d$$

where $K_{ad}$ is a constant equal to $$\frac{T_M + T_L}{T_M - T_L}.$$

Since the acceleration $\alpha_1$ is determined in dependence on the aforementioned various factors, i.e. the motor current $I_M$, the magnetic flux $\phi$, the source voltage $E_{dc}$, the duty ratio $D_t$, the armature resistance $R_a$, the wiring resistance $R_x$, the moment of inertia of the motor $J_M$ and the moment of inertia of the load $J_L$, the deceleration of the motor for a given angular distance can individually be determined at each of the deceleration steps.

Figure 2A:
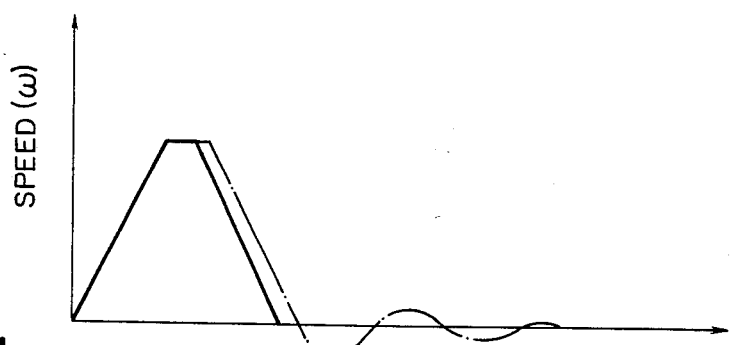
FIGS. 2a, 2b and 2c are views for graphically illustrating improvement of the decelerating method illustrated in FIGS. 1a, 1b and 1c.
Figure 2B:
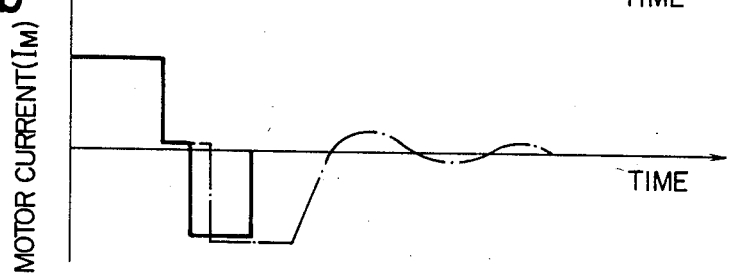

In this way, the position $\theta_d$ relating to the distance to be covered by the motor to attain the target or commanded position can be arithmetically determined at each of the divided deceleration steps, whereby the motor can be smoothly stopped without being accompanied with any hunting phenomenon, as illustrated by the solid line curves in FIGS. 1a, 1b and 1c. In other words, the stopping behavior of the motor represented by the single-dot broken line curves in FIGS. 1a, 1b and 1c is improved to such performance as represented by solid line curves in FIGS. 2a, 2b and 2c.

For simplification of description, it is assumed that the load torque $T_L$ in both accelerating and decelerating phase is negligible when compared with the motor torque $T_M$. In reality, in the field of the data or information processing machines to which the motor is applied, the load torque $T_L$ is in most cases only a few percentages of the motor torque $T_M$.

On the above assumption and on the condition that $K_{ad}$ approximates roughly to 1, the deceleration $\alpha_2$ and the speed $\omega$ at which the deceleration is to be started are given as follows:

$$\alpha_2 = \alpha_1 \tag{15}$$

$$\omega = \sqrt{2 \times \alpha_1 \times \theta} \tag{16}$$

Figure 2C:
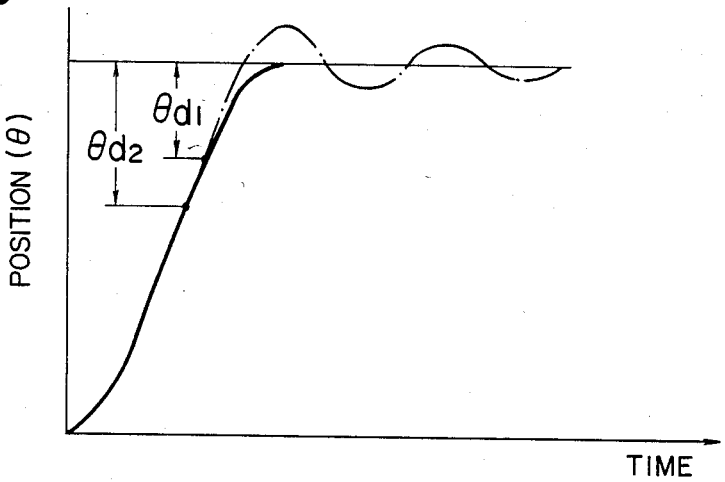

Thus, the improved value $\theta_{d2}$ illustrated in FIG. 2c is 1.5 ($\approx 1/0.7$) times as large as the value $\theta_{d1}$ shown in FIG. 1c.

It is here assumed that the motor current $I_M$ does not vary in either the accelerating phase or the decelerating phase. In view of the fact that the motor should be accelerated and subsequently decelerated within a possible minimum time, the motor current $I_M$ may be regarded equal to the value limited by the current capacity of the control circuit.

For determining the acceleration, variation or change of the speed per unit time may be measured or alternatively the time taken for the motor to reach a predetermined or unit speed may be detected.

Figure 3:
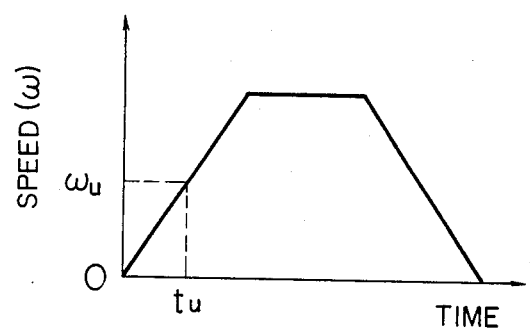
FIG. 3 is a view for graphically illustrating a method of detecting a speed per unit time.

FIG. 3 illustrates a method of detecting the speed per unit time. When the speed $\omega_u$ per unit time $t_u$ is thus determined, the aforementioned acceleration $\alpha_1$ is given by $$\alpha_1 = \omega_u / t_u \qquad (17)$$

Figure 4:
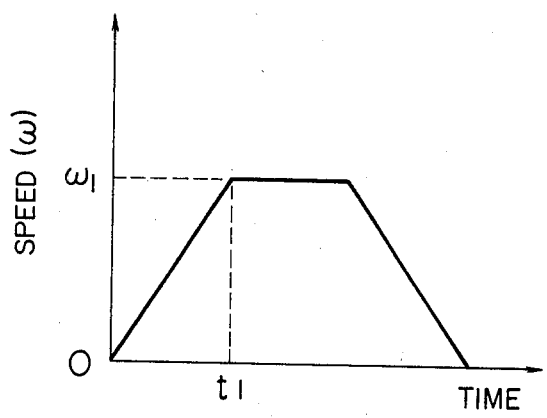
FIG. 4 is a view for graphically illustrating changes in a motor speed as a function of time.

In case the time $t_1$ required for the motor to attain a predetermined speed (which is assumed to be the maximum speed $\omega_1$ in the illustrated case) is determined on the basis of a curve representing relation between the speed $\omega$ and the time, as shown in FIG. 4, the acceleration $\alpha_1$ is given by $$\alpha_1 = \omega_1 / t_1 \qquad (18)$$

On the basis of the acceleration $\alpha_1$ determined in this way, the deceleration $\alpha_2$ as well as the speed $\omega$ at which the deceleration is to be started can be determined in accordance with the expressions (13) and (14).

On the other hand, $\theta_d$ can be determined by measuring the instantaneous motor position.

The deceleration $\alpha_2$ can be controlled in terms of the speed $\omega$ at the position $\theta$ relating to the distance remaining to the motor to cover.

Figure 5A:
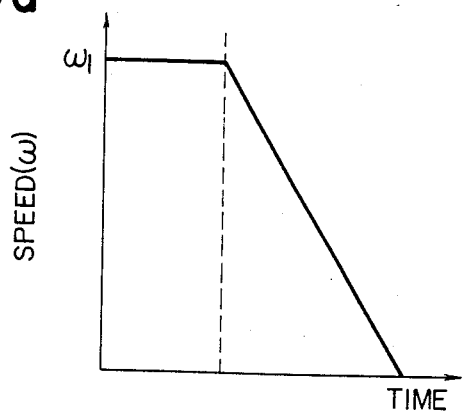
FIGS. 5a and 5b are views for graphically illustrating relations between motor speed and time and between motor position and time in the motor decelerating phase.
Figure 5B:
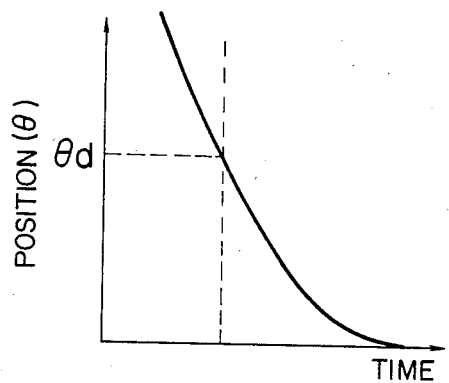

FIGS. 5a and 5b are views for graphically showing variations or changes of the speed $\omega$ and the position $\theta$ as a function of time, respectively.

When the time point at which the deceleration is started is set to zero, the relationship between the position $\theta$ and the speed $\omega$ mentioned above can be expressed as follows:

$$\theta = \theta_d - \left( \omega_1 t - \frac{\alpha_2 t^2}{2} \right) \qquad (19)$$

Figure 6:
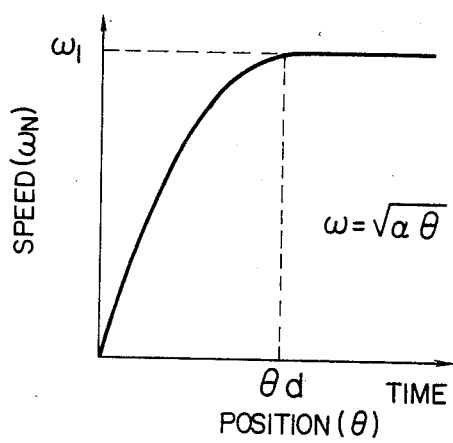
FIG. 6 is a view for graphically illustrating a relation between the motor speed and the motor position in the decelerating phase.

FIG. 6 graphically illustrates this relation between the position $\theta$ and the speed $\omega$. The speed $\omega$ at a given position $\theta$ can thus be determined, and hence the deceleration $\alpha_2$ can be controlled by controlling the speed $\omega$ as the speed command value $\omega_N$.

In this way, by determining the speed $\omega_N$ corresponding to the position $\theta$ (FIG. 6) on the basis of the acceleration in the accelerating phase upon each position control, the deceleration can adaptably be so controlled that variation in load or the like variables may be appropriately taken into acount, whereby the motor control is allowed to smoothly enter the stop routine.

Upon completion of each deceleration step, gain is progressively decreased. More specifically, when the last commanded speed in the decelerating phase is represented by $\omega_N$ with the corresponding motor speed being represented by $\omega$, the duty $D_t$ or the voltage applied to the motor is given by the following expression:

$$D_t = G \times (\omega_N - \omega) \qquad (20)$$

where G represents the gain (proportional constant). This gain G is decreased, as the remaining distance represented by the instantaneous position $\theta$ of the motor is reduced. However, excessive decreasing of the gain would result in too small duty to drive the motor. To evade such situation, the formula for determining the duty $D_t$ may be modified as follows:

$$D_t = J_n + \delta \qquad (21)$$

where $J_n = J_{n-1} + \delta$. The suffix n represents a time series in which n represents the instant value while (n−1) represents the preceding value. Further, $\delta$ represents a value to be added and corresponds to an integral constant. When the motor has attained the aimed or target position in this manner, the control is then so performed that the motor is held at that position. In case of the motor insusceptible to the cogging, the hold control can be accomplished merely by turning off the power supply source, i.e. by setting the duty $D_t$ to zero. However, in the motor which is susceptible to the cogging, it is required to apply to the motor a duty voltage equivalent to the cogging torque for overcoming the latter.

Figure 7:
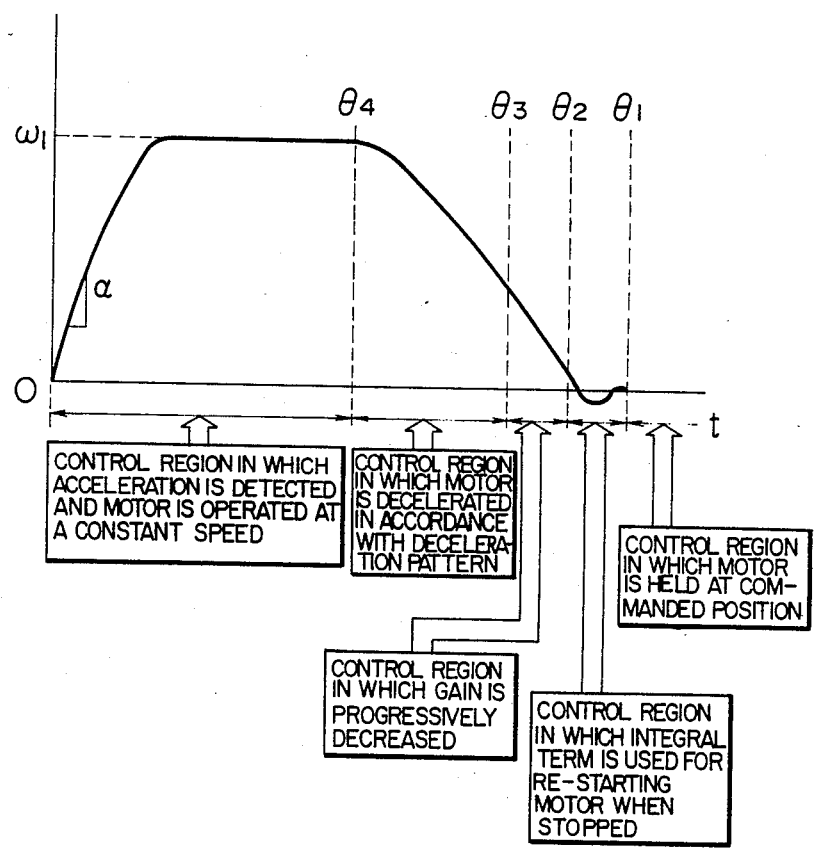
FIG. 7 is a view for graphically illustrating various control regions included in the motor control process from the starting of the motor to the stopping thereof.

FIG. 7 illustrates in summary the motor control method described above. It will be understood that the content or objective of the control varies in dependence of the position $\theta$. More specifically, in a region where $\theta > \theta_4$, the motor is operated at the maximum speed $\omega_1$. In a region where $\theta_4 > \theta > \theta_3$, the motor is driven in accordance with the deceleration pattern which is determined on the data of acceleration $\alpha_1$ measured previously. In a region where $\theta_3 > \theta > \theta_2$, the gain is progressively decreased to thereby lower correspondingly the motor speed. In a region where $\theta_2 > \theta > \theta_1$, an integral term is added to prevent the motor from being stopped or to allow the motor to be re-started even when it is stopped. In a region where $\theta_1 > \theta$, the duty control is performed to hold stationarily the motor at the aimed position notwithstanding the cogging torque.

The present invention starts from the basic technical concept elucidated above and is characterized by the various factors and the features mentioned in the foregoing.

Now, a concrete example of the position control for an electric motor according to the present invention will be described in conjunction with a preferred embodiment of the motor position control apparatus according to the invention.

Figure 8:
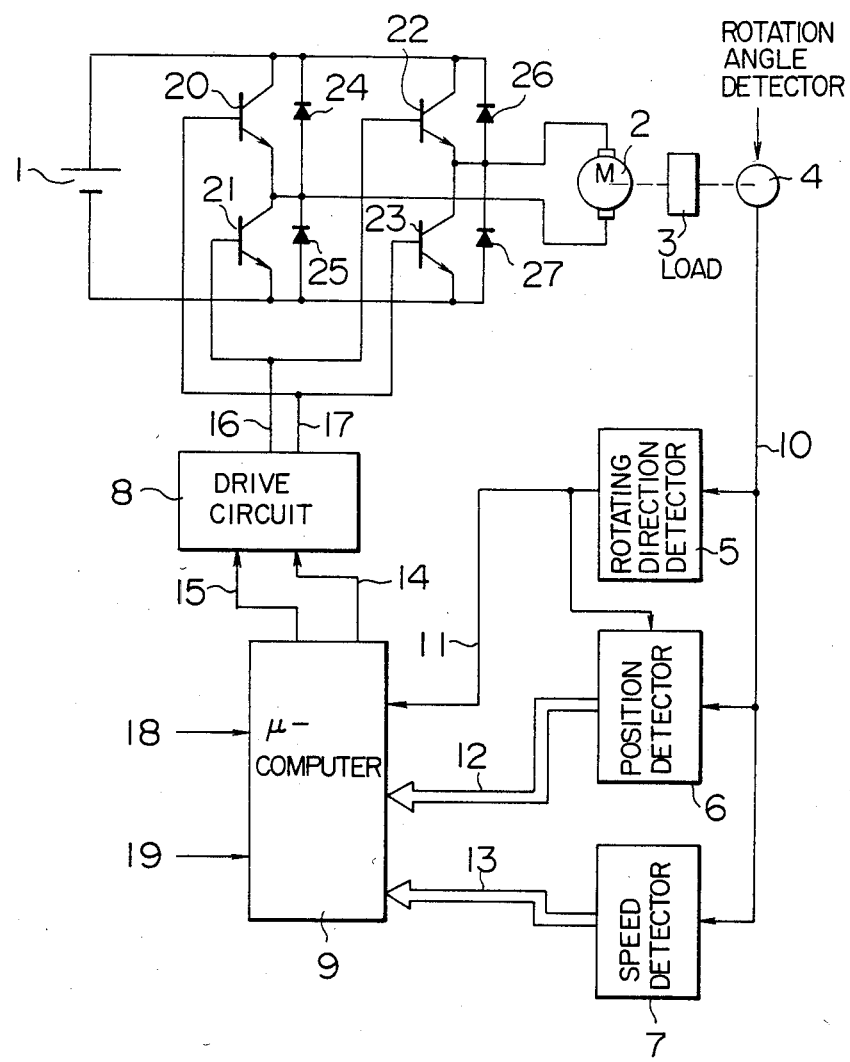
FIG. 8 is a schematic circuit diagram showing in general an arrangement of a motor position control apparatus according to an embodiment of the present invention.
Figure 9:
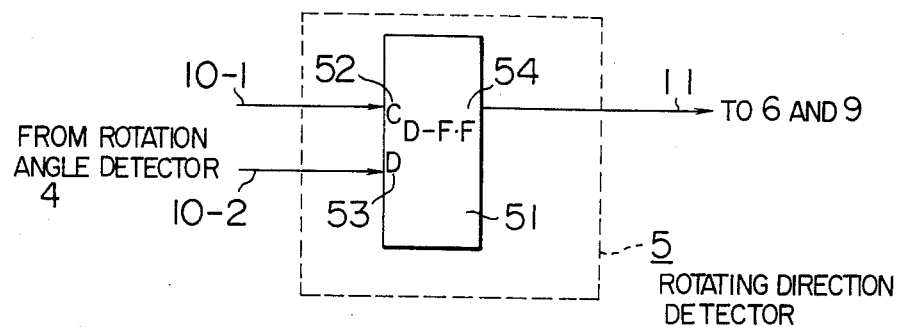
FIG. 9 is a schematic circuit diagram showing an examplary structure of a rotating direction detecting circuit used in the apparatus shown in FIG. 8.
Figure 10:
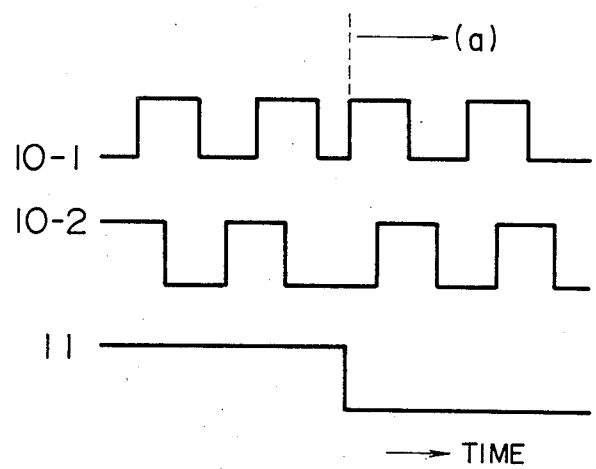
FIG. 10 is a signal timing chart for illustrating operation of the rotating direction detecting circuit.
Figure 11:
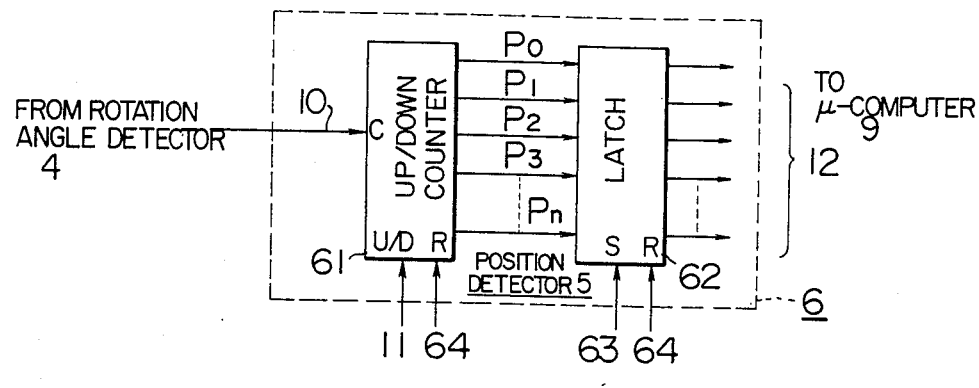
FIG. 11 is a schematic circuit diagram showing an exemplary structure of a motor position detecting circuit used in the apparatus shown in FIG. 8.
Figure 12:
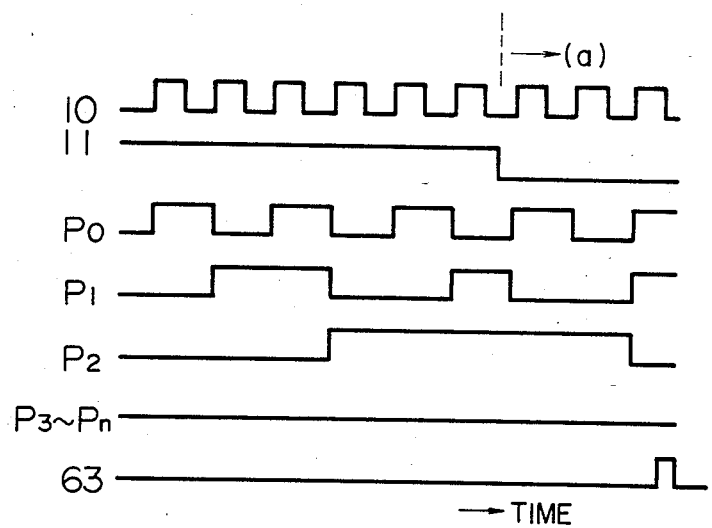
FIG. 12 is a signal timing chart for illustrating operation of the position detecting circuit.
Figure 13:
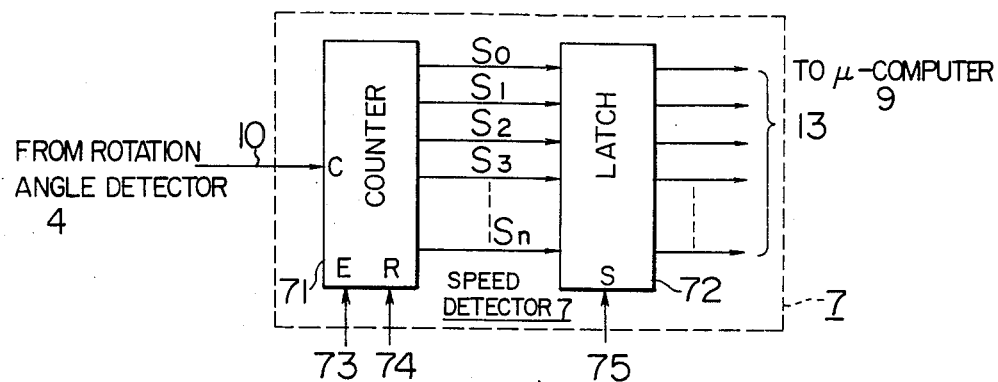
FIG. 13 is a schematic circuit diagram of a speed detecting circuit used in the apparatus shown in FIG. 8.
Figure 14:
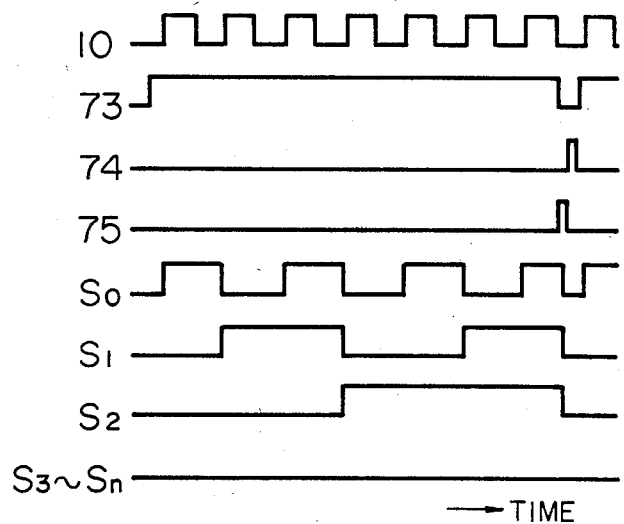
FIG. 14 is a signal timing chart for illustrating operation of the speed detecting circuit.
Figure 15:
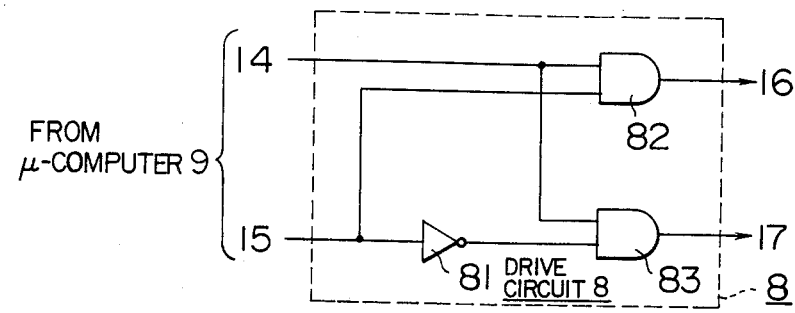
FIG. 15 is a schematic circuit diagram of a drive circuit used in the apparatus shown in FIG. 8.
Figure 16:
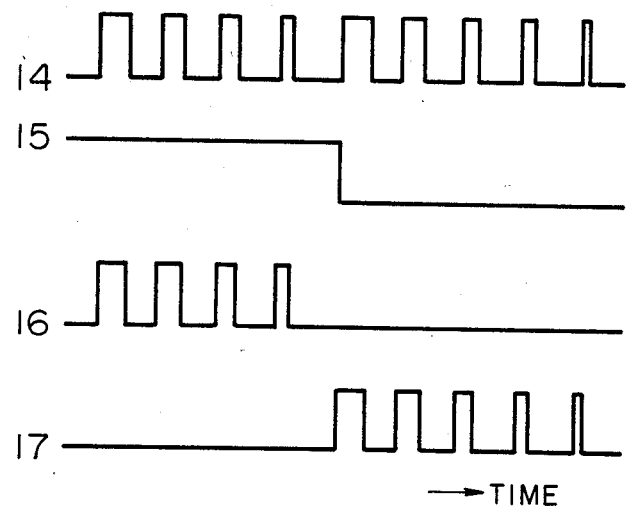
FIG. 16 is a signal timing chart for illustrating operation of the drive circuit.
Figure 17:
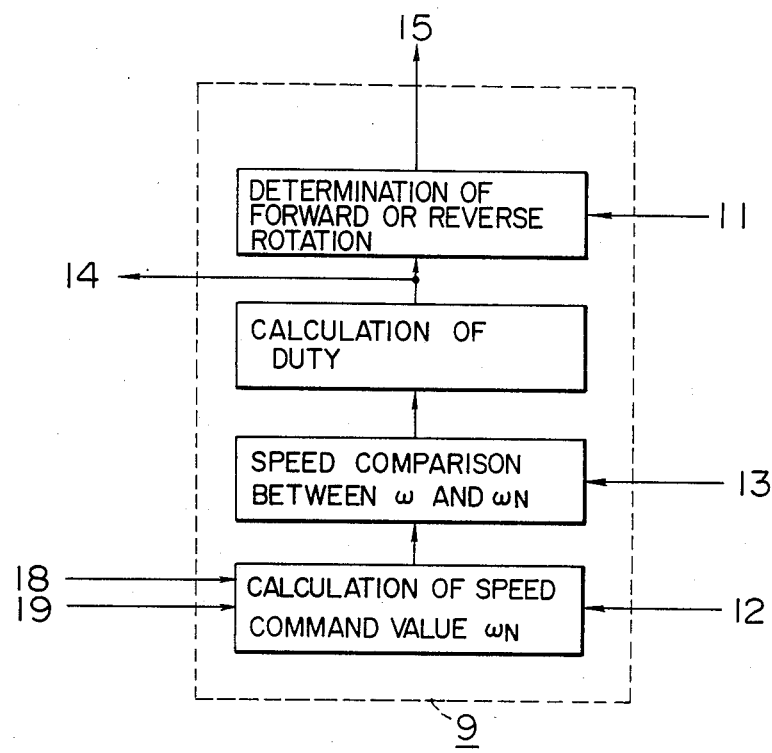
FIG. 17 is a functional block diagram of a micro-computer used in the apparatus shown in FIG. 8.

In the description which follows, reference is made to FIGS. 8 to 18, in which FIG. 8 is a circuit diagram showing a general arrangement of a position control apparatus according to an embodiment of the invention, FIG. 9 is a schematic circuit diagram of a rotating direction detector circuit employed in the position control apparatus shown in FIG. 8, FIG. 10 is a timing diagram for illustrating operation of the rotating direction detector shown in FIG. 9, FIG. 11 is a schematic circuit diagram showing an exemplary arrangement of a position detector circuit, FIG. 12 is a signal waveform diagram for illustrating operation of the position detector shown in FIG. 11, FIG. 13 is a schematic circuit diagram showing an exemplary arrangement of a speed detector circuit, FIG. 14 is a signal waveform diagram for illustrating operation of the speed detector shown in FIG. 13, FIG. 15 is a circuit diagram showing an examplary arrangement of a drive circuit, FIG. 16 is a signal waveform diagram for illustrating operation of the drive circuit shown in FIG. 15, FIG. 17 is a functional block diagram showing an exemplary arrangement of a micro-computer circuit employed in the position control apparatus, and FIG. 18 is a flow chart for illustrating operation of the micro-compuer.

First referring to FIG. 8, an H-bridge circuit composed of transistors 20, 21, 22 and 23 and a diode bridge circuit composed of diodes 24, 25, 26 and 27 are connected to a power supply source 1. More specifically, collectors of the transistors 20 and 22 and cathodes of the diodes 24 and 26 are connected to the positive pole of the power supply source 1 which has the negative pole connected to emitters of the transistors 21 and 23 and anodes of the diodes 25, 26 and 27.

The transistor 20 has an emitter connected together with the collector of the transistor 21, the anode of the diode 24 and the cathode of the diode 25 to one terminal of a motor 2 which has the other terminal connected to the emitter of the transistor 22, the collector of the transistor 23, the anode of the diode 26 and the cathode of the diode 27.

The motor 2 has an output shaft for driving a load 3 and a rotation angle detector 4. The latter produces a rotation angle signal 10 supplied to a rotating direction detector circuit 5, a position detector circuit 6 and a speed detector circuit 7.

The rotating direction detector circuit 5 produces a signal 11 indicative of the direction of rotation of the motor 2, which signal 11 is supplied to the inputs of a micro-computer circuit 9 and the position detector 6.

The position detector circuit 6 is adapted to produce a position signal 12, while the speed detector circuit 7 outputs a speed signal 13. Both signals 12 and 13 are supplied to the micro-computer circuit 9.

An external apparatus (not shown) is connected to the micro-computer 9 for supplying thereto a position command signal 18 and a maximum speed command signal 19.

The micro-computer circuit 9 produces a duty signal 14 and a forward/reverse rotation signal 15, both being applied to the inputs of a drive circuit 8 which in turn has a forward rotation output 16 coupled to the bases of the transistors 21 and 22, respectively, and a reverse or backward rotation output 17 which is coupled to the bases of the transistors 20 and 23, respectively.

With the circuit arrangement described above, the position control apparatus operates in the manner mentioned below.

Upon application of the position command 18 and the speed command 19, the micro-computer circuit 9 fetches the rotating direction signal 11 indicating the direction in which the motor 2 is rotated, the speed signal 13 indicating the speed at which the motor runs and the position signal 12 indicating the position of the motor (the rotor position) to execute arithmetic operations on the basis of these inputs for producing the duty signal 14 prescribing a voltage to be applied to the motor and the forward/reverse rotation signal 15 which determines the rotating direction of the motor 2. The duty signal 14 and the foward/reverse rotation signal 15 are supplied to the drive circuit 8.

In case of the motor is to be driven in the forward direction, the drive circuit 8 outputs the forward rotation signal 16 to thereby turn on the transistors 21 and 22 in conformance with the duty signal 14, whereby the motor 2 is applied with the moment of rotation.

Initially, the position signal 12 indicative of the motor position is significantly deviated from the position command signal 18. Accordingly, the duty of the voltage applied to the motor 2 is increased to thereby promote the response of the motor 2.

When the speed signal 13 approaches to the maximum speed command 19 as the motor speed increases, the drive circuit 8 then outputs the reverse rotation signal 17 to thereby turn on the transistors 20 and 23 for applying a braking force to the motor 2 so that the latter can stably be stopped sooner at the position indicated by the position command signal 18.

The individual components represented by blocks in FIG. 8 will be described below in more detail.

An exemplary circuit arrangement of the rotating direction detector circuit 5 is shown in FIG. 9. A reference numeral 51 denotes a D-type flip-flop which has a clock input terminal 52 applied with one phase rotation signal 10-1 produced by the rotation angle detector 4 of two-phase output type and a D-input terminal 52 applied with the other phase rotation signal 10-2 also outputted from the same detector 4.

The flip-flop 51 is operated in response to the rising edge of the input signal applied to the clock terminal 52. Accordingly, when the rotation signal 10-2 outputted from the two-phase rotation angle detector 2 leads the other rotation signal 10-1, the rotating direction signal 11 produced at the output 54 of the flip-flop 51 is at logic "1" level upon the rise-up of the rotation signal 10-1 applied to the clock input terminal 52, since the other rotation signal 10-2 applied to the D-input terminal is logic "1" at that time, as will be seen from the timing diagram shown in FIG. 10.

On the contrary, when the rotation signal 10-1 leads the other rotation signal 10-2 in the twophase output of the rotation angle detector 4 due to reversion of the rotating direction of the motor, the rotating direction signal 11 produced at the output terminal 54 of the flip-flop 51 is at the logic "0" level, since the rotation signal 10-2 applied to the D-input is at the "0" level when the rotation signal 10-1 rises up, as is indicated at (a) in FIG. 10.

In this way, the direction in which the motor is rotated can discriminably be detected by the rotating direction detector circuit 5.

Next, the position detector circuit 5 will be described in detail by referring to FIG. 11. This circuit 5 is composed of an up/down counter 61 and a latch 62.

The up/down counter 61 has a clock input terminal c applied with the rotation signal 10 and an up/down input terminal U/D applied with the rotation angle signal 11. Output terminals $P_0$, $P_1$, ..., $P_n$ of the up/down counter 6 are connected to the inputs of the latch 62 having the output terminals from which the position signal 12 is taken out. The latch circuit 62 has a strobe terminal S applied with a strobe signal 63 for triggering the latch operation. Further, the up/down counter 61 and the latch 62 have reset input terminals (R) 64, respectively.

In operation of the position detector 5, the up/down counter 61 counts up the rotation signal 10 applied to the clock input terminal C, so long as the rotating direction signal 11 is at logic "1" level, whereby the output signal from the up/down counter 61 varies in such a manner as illustrated in FIG. 12 at $P_0$, $P_1$, $P_2$ and $P_3-P_n$. Upon reversion of the rotating direction of the motor 2, the rotating direction signal 11 takes the level of logic "0", as shown at (a) in FIG. 12, whereupon the up/down counter 61 begins to count the rotation signal 10 in the down direction. At every predetermined time, the strobe signal 63 is applied to the latch 62 which then latches the content in the up/down counter 61 to thereby update the value of the position signal 12.

At the time point at which a new value of the position command 18 is inputted, the up/down counter 61 and the latch 62 are reset in response to the reset signal 64 applied to the respective reset terminals R.

Referring to FIG. 13, the speed detector circuit 7 is constituted by a counter 71 and a latch 72.

The counter 71 has a clock input terminal applied with the rotation signal 10 from the rotation angle detector 4, an enable terminal E applied with a counter enable signal 73 of a predetermined duration (refer to FIG. 14 at 73) and a reset terminal R applied with a counter reset signal 74. The counter 71 produces output signals $S_0, \ldots, S_n$ which are coupled to the inputs of the latch 72 having output terminals from which the speed signal 13 is taken out. The latch 72 is applied with a latch strobe signal 75.

Operation of the speed detector circuit 7 is illustrated in the timing diagram of FIG. 14. As will be seen from the figure, the counter 71 operates to count the rotation signal 10 so long as the counter enable signal 73 is present at the enable terminal E. The output signals of the counter 71 are such as illustrated at $S_0$, $S_1$, $S_2$ and $S_3-S_n$ in FIG. 14. In response to the latch strobe signal 75, the latch 72 latches the output signals $S_0, \ldots, S_n$. Immediately after the latch operation, the counter 71 is reset in response to the counter reset signal 74 to the state ready for the next counting operation. Thus, the counter 71 continues to count the rotation signal pulses 10 for a period corresponding to the duration of the counter enable signal 73, whereby the count value proportional to the speed of the motor 2 is obtained as the speed signal 13.

Referring to FIG. 15, the drive circuit 8 is composed of an inverter gate 81 and AND gates 82 and 83.

The duty signal 14 described hereinbefore is applied to one input of the AND gates 82 and 83, respectively. The AND gate 82 has the other input to which the forward/reverse rotation signal 15 is directly applied, while the AND gate 83 has the other input supplied with the forward/reverse rotation signal 15 by way of the inverter gate 81.

With the structure of the drive circuit 8 mentioned above, the AND gate 82 allows the duty signal to make appear at the output thereof in response to the duty signal 14 and the forward/reverse rotation signal 15, only when the forward/reverse rotation signal 15 is at "1" level, whereby the forward rotation signal 16 is outputted, as will be seen from FIG. 16. On the other hand, the duty signal 14 is gated to the output of the AND gate 83 to constitute the reverse rotation signal 17 only when the foward/reverse rotation signal 15 is at "0" level.

The micro-computer circuit 9 is composed of a control processing unit, a random access memory or RAM, a read-only memory or ROM, input/output devices and 18 and the maximum speed command signal 19 from the external apparatus (not shown) through the input/output devices (also not shown) and compares them with the current or instant (actual) position signal 12 to arithmetically determine the value of the speed command signal $\omega_N$ on the basis of the result of the comparison. Subsequently, the current (actual) speed signal 13 is inputted to the micro-computer circuit 9 which then arithmetically determine the duty corresponding to the difference between the current speed signal and the speed command signal $\omega_N$ mentioned above, the difference being outputted as the duty signal 14.

Further, the rotating direction signal 11 also is inputted to the micro-computer 9 to be processed together with the position command signal 8 and the position signal 12 for determining the forward or reverse (backward) rotation of the motor, whereby the forward-/reverse rotation signal 16 of the corresponding level is outputted.

Next, a typical process of position control performed by the position control system described above will be elucidated with the aid of a flow chart shown in FIG. 18.

Upon activation of the program, the maximum speed value $\omega_1$ and the position command value $\theta_0$ supplied from the external apparatus are supplied to the microcomputer circuit 9 as the position command signal 8 and the maximum speed command signal 19, as shown in FIG. 8. When the position command value $\theta_0$ is greater than a predetermined reference position $\theta_c$, the speed $\omega$ and position $\theta$ of the motor as well as the rotating direction signal $R_W$ are sampled to determine the speed $\omega_N$ at which the motor is to run, the duty $D_t$ and the forward/reverse rotation signal $R_0$ of the proper level. The motor speed $\omega_c$ at the reference position $\theta_c$ as well as the time $t_c$ taken for the motor to reach the reference position $\theta_c$ is stored in the RAM.

On the other hand, when the position command value $\theta_0$ is smaller than the reference position $\theta_c$, the speed $\omega_c$ and the time $t_c$ obtained in the preceding cycle are stored to be again utilized. Acceleration is arithmetically determined on the basis of $\omega_c$ and $t_c$, and a deceleration pattern as well as the position $\theta_d (\theta_4)$ is calculated on the basis of the determined acceleration.

Processes or steps executed in accordance with the flow chart are listed in detail in the following table in which there are summarized a series of steps of starting the motor to the final position thereof in dependence on the motor positions $\theta$, being classified into five control regions in which different controls and operations of the motor are carried out.

TABLE 1

| $\theta$ Region | ① | $\theta_4$ ② | $\theta_3$ ③ | $\theta_2$ ④ | $\theta_1$ ⑤ |
|---|---|---|---|---|---|
| Control Procedure | Duty = G × ($\omega_1 - \omega$) $\omega_1$ is at maximum value (constant) | Duty = G × ($\omega_N - \omega$) $\omega_N$ is decreased in accordance with a pattern | Duty = G' × ($\omega_N - \omega$) $\omega_N$ is at miniumum value (constant) G' is progressively decreased | Duty = $J_n + \theta \cdot$ $J_n = J_{n-1} + \delta$ $J_n = 0$ $\delta$: integral constant | Duty = 0 or alternatively equivalent to the cogging torque is outputted |
| Operation | Acceleration is detected in the accelerating phase Constant speed control is effected at maximum speed $\omega_1$ | Operation in accordance with a deceleration pattern | Gain G' is progressively decreased | Upon stopping of motor, duty is increased by adding integral term | Motor is held at a prescribed position | others (all not shown), and operates in accordance with a program stored in the ROM.

A functional block diagram of the micro-computer is shown in FIG. 17. Referring to this figure, the micro-computer is supplied with the position command signal Subsequently, the motor position $\theta$, motor speed $\omega$ and the rotating direction $R_W$ are again sampled. When $\theta > \theta_4$, the maximum speed $\omega_1$ is used as the speed command, and the duty determined in accordance with $D_t = G \times (\omega_1 - \omega)$ is outputted, where $\omega_1$ is the maximum speed and $\omega$ represents the detected (actual) motor speed. This phase corresponds to the control region ① in the Table 1. As the motor runs at the maximum speed $\omega_1$, the distance remaining to the motor to cover is reduced, and the control enters eventually the control region ② where $\theta_4 > \theta > \theta_3$. In this control region ②, the speed command $\omega_N$ is read out from a previously determined deceleration pattern to cause the motor to run in accordance with the deceleration pattern which is determined as a function of the acceleration $\alpha$ and the position error or deviation $\theta_n$ and given by $\omega_n = \sqrt{\alpha \theta_n}$.

In this control region ②, the duty is determined in accordance with $D_t = G \times (\omega_N - \omega)$.

In the control region ③ where $\theta_3 > \theta > \theta_2$, the final value of the preceding pattern, that is, the minimum value $\omega_N$ is used as the speed command, and the gain G is progressively reduced down to G'. At that time, the gain G' is related to the position $\theta$ and decreases with decrease of $\theta$. The duty in this control region ③ is determined in accordance with $D_t = G' \times (\omega_N - \omega)$. Although the speed command $\omega_N$ is constant in this region ③, the duty $D_t$ is reduced as the gain is progressively decreased, whereby the motor is smoothly decelerated.

In the control region ④ where $\theta_2 > \theta > \theta_1$, the duty is determined in consideration of the integral term. Namely, the initial value $J_0$ of the integral term is set equal to 0, and the duty $D_t$ is determined as follows:

$$J_n = J_{n-1} + \delta$$

$$D_t = J_n + \theta$$

where $\delta$ is an integral constant which may selectively be determined in consideration of the sampling time and the acceleration. An excessively large value of $\delta$ will bring about rapid change of the duty $D_t$, making it impossible to attain the smooth stoppage of the motor due to steep acceleration notwithstanding the motor position being very close to the aimed stop position. To the contrary, when $\delta$ is excessively small, the motor will be once stopped and take a time for being restarted, to thereby increase the time required for the positioning. Under the circumstances, the value $\delta$ is so selected that the motor does not stop on the way, to thereby allow the control routine to enter the region ⑤ where $\theta_1 > \theta$. In this region, the motor is held at the position where it stops. If oscillation or hunting occurs, the duty is progressively reduced so as to output the duty equivalent to the cogging torque of the motor for overcoming it. The duty arithmetically determined is outputted together with the forward/reverse rotation signal $R_0$. Subsequently, the control process described above may be repeated by sampling again the values $\theta$, $\omega$ and $R_W$.

Among the control regions described above, some have noticeable features which will be mentioned below.

Figure 19A:
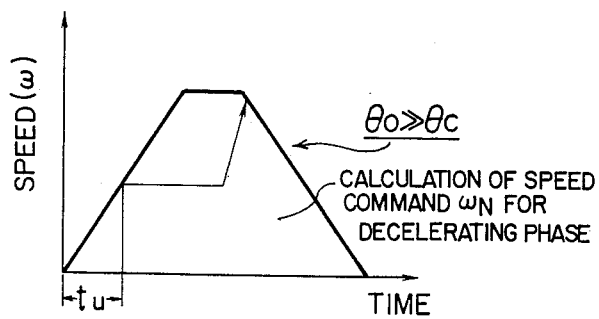
FIGS. 19a, 19b and 19c are views for graphically illustrating a method of measuring acceleration in the starting phase of a motor and a procedure for selecting a deceleration pattern on the basis of the acceleration.
Figure 19B:
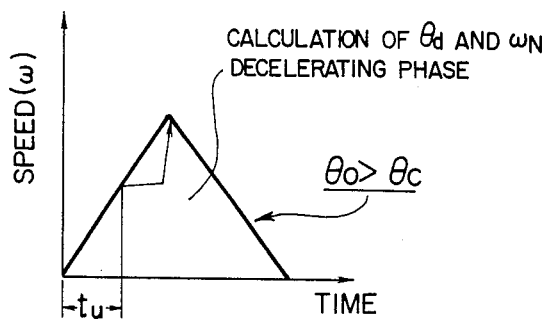
Figure 19C:
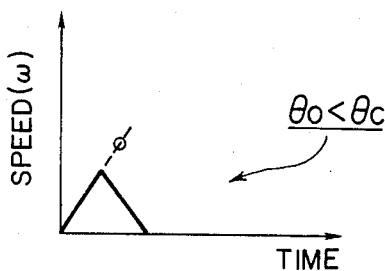

In the first place, the timing at which the speed command in the decelerating phase is calculated on the basis of the acceleration in the accelerating phase or the control region ① will be considered. Basically, it is desirable that the speed command in the decelerating phase be previously calculated in each accelerating phase in succession to the initiation of the positioning control in response to the refreshed position command $\theta_0$. Execution of this calculation requires a unit time for sampling the acceleration and a time for calculating the speed command $\omega_N$ in the decelerating phase on the basis of the sampled acceleration. In the alternative case where the acceleration is determined on the basis of a unit speed as described hereinbefore, the time required for the motor to attain the unit speed as well as the time taken for calculating the speed command $\omega_N$ for the decelerating phase has to be available. Under the circumstance, when the distance for which the motor must run in response to a given position command $\theta_0$ is significantly small, the position control based on the calculation of the speed command $\omega_N$ for the decelerating phase by measuring the acceleration is rendered impractical. Accordingly, a feature of the present invention resides in that each position command $\theta_0$ as issued is compared with the reference value $\theta_c$ which is selected so as to be of a sufficient magnitude to calculate the speed command $\omega_N$ for the decelerating phase, and when the comparison has proven that $\theta_0 < \theta_c$, then the previously stored speed command $\omega_N$ or alternatively the speed command $\omega_N$ which was used in the preceding positioning control is utilized in the instant or current positioning control. This feature is illustrated in FIGS. 19a, 19b and 19c. In FIGS. 19a and 19c, it is assumed that $\theta_0 > \theta_c$, while $\theta_0 < \theta_c$ in FIG. 19c. In the case of the positioning controls illustrated in these figures, a full voltage or a predetermined constant voltage is applied to the motor in the accelerating phase which immediately follows the starting of the motor, and after a predetermined time lapse the motor speed is sampled. The acceleration $\alpha_1$ is determined on the basis of the sampled motor speed. A deceleration pattern for leading the motor to stoppage is selected on the basis of the acceleration $\alpha_1$. In this connection, it is noted that the full voltage should preferably be applied to the motor, since then the acceleration can be determined in a shorter time, providing a high speed response characteristic to an advantage.

The motor control operation in the above mentioned case will be described by referring to a flow chart shown in FIG. 20. Upon activation of the control program, the maximum speed $\omega_1$ and the position command $\theta_0$ are supplied to the micro-computer 9 through the inputs 19 and 18 shown in FIG. 8 (step a). Next, the minimum distance or displacement $\theta_c$ that allows the ratio between the motor torque $T_M$ and the inertial load $J_M$ of the motor to be determined is compared with the reference value $\theta_0$ (step b). When $\theta_0 \geq \theta_c$, the rotating direction command $R_W$ is fetched at a step c to produce the forward or the reverse (backward) rotation command signal $R_0$ which is applied to the drive circuit 8 together with the duty signal representing the duty ratio of 100% (step d). Subsequently, it is determined whether a predetermined time $t_c$ has elapsed at a step e. If the result of the step e is affirmative, the motor speed $\omega_c$ at that time point is sampled (step f). The deceleration pattern in the decelerating phase is determined on the basis of the motor speed $\omega_c$ (step g). It should be recalled that the speed $\omega_c$ is substantially proportional to the acceleration $\alpha_1$. For example, the speed $\omega_c$ is low when inertia is large and vice versa. Accordingly, it is permitted to calculate the acceleration $\alpha_1$ on the basis of the motor speed $\omega_c$ (i.e. rotation number of the motor) attained upon lapse of the predetermined time $t_c$.

When $\theta_0 < \theta_c$, i.e. the commanded displacement or distance is small, the duty $D_t$ cannot be selected to be 100%. At that time, execution of the program branches to a step h from the step b, wherein the deceleration pattern is determined on the basis of the motor speed $\omega_c$ used in the preceding control cycle. Unless the preceding valeu of $\omega_c$ is unavailable, the deceleration pattern is selected from those initialized upon activation of the program. In succession to the determination of the deceleration pattern at the step g or h, the constant speed operation of the motor is effected at the maximum speed $\omega_1$ (step i). An instantaneous motor position $\theta$ is sampled at a step j, and the speed $\omega$ determined in accordance with $\omega = \sqrt{\alpha \cdot \theta}$ where $\alpha$ corresponds to $\omega_c$ is compared with $\omega_1$ at a step k. When $\omega \leq \omega_1$, the decelerating process is initiated in accordance with the deceleration pattern determined at the step g or h (step 1). Subsequently, an instantaneous position $\theta$ is sampled at a step (m), and the duty $D_t$ as well as the forward/reverse rotation $R_0$ is arithmetically determined on the basis of the sampled position $\theta$ and the deceleration pattern to e subsequently supplied to the drive circuit 8 (step o). When the motor has attained the position at which it is to be stopped (step p), a stop routine is activated to stop the motor (step q).

In this way, when the value of the position command $\theta_0$ is equal to or exceeds the reference value $\theta_c$ defined hereinbefore, the optimal deceleration pattern for the decelerating phase can be calculated on the basis of the speed data in the accelerating phase. By virtue of this feature, the optimal deceleration of the motor substantially insusceptible to the hunting (excursion) can be accomplished nonwithstanding exchange of the motor and/or load and the changes in the motor torque and/or load due to temperature change or other causes, assuring thus the smooth positioning control.

Figure 20:
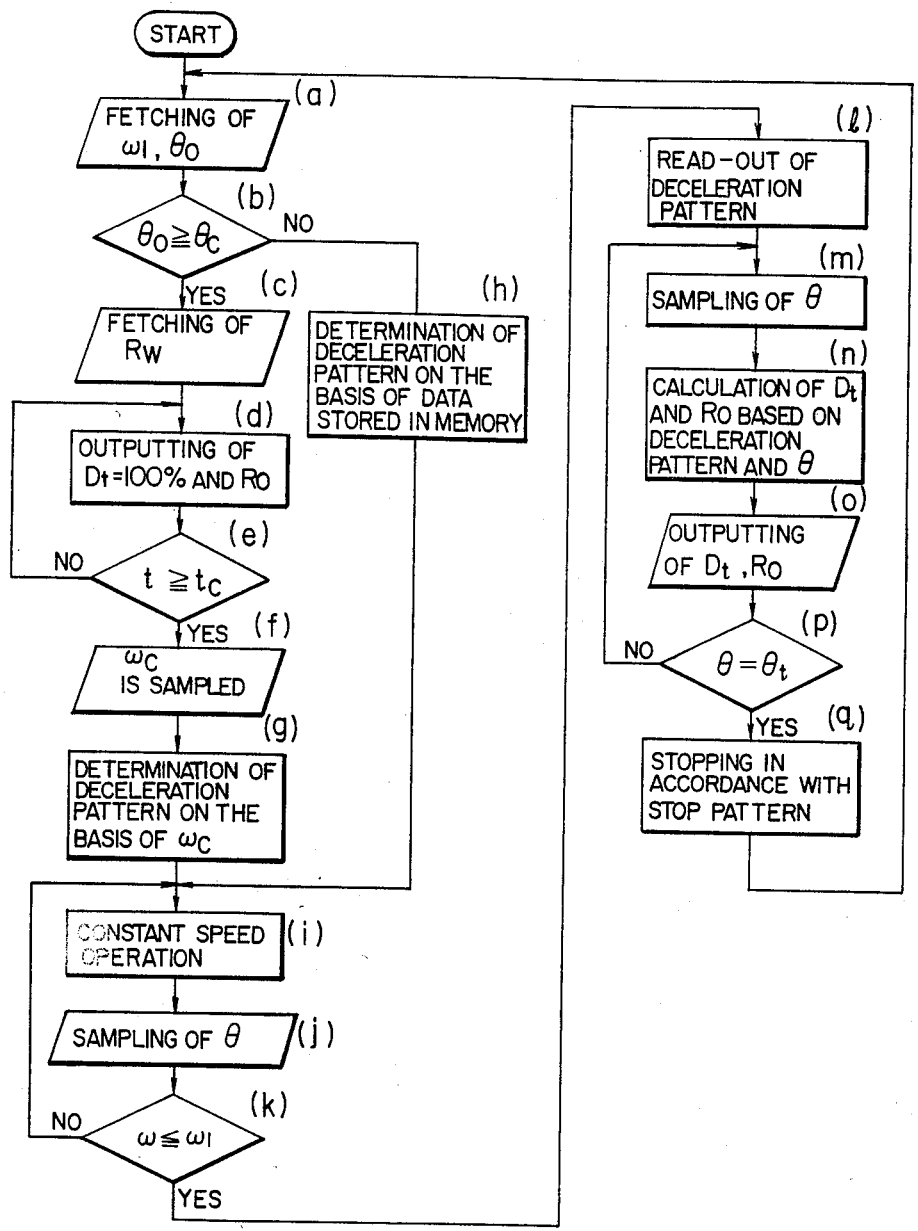
FIG. 20 shows a flow chart for illustrating operations for carrying out the method and the procedure illustrated in FIGS. 19a, 19b and 19c.

In the case of the control illustrated in FIG. 20, the acceleration data to be utilized for the determination of the deceleration pattern is determined on the motor speed or the rotation number $\omega_c$ at the time $t_c$ elapsed from the starting of the motor. It will however be understood that the deceleration pattern may be arithmetically determined on the basis of rate of change in the rotation number at any give time point in the course of the acceleration to the similar effect.

Next, in the control region ④, the positioning control for stopping the motor at a given commanded stop position is so effected that when the motor is stopped at a position which is short of the commanded stop position or beyond the latter, the motor is restarted by increasing progressively the voltage applied to the motor. More specifically, a control circuit capable of applying a variable voltage of positive or negative polarity across the motor terminal is provided which is constituted by a circuit supplied with a given positioning command, a circuit for deriving the motor speed signal and the motor position signal from the output signal of the rotation angle detector, the micro-computer for arithmetically processing the speed signal and the position signal, a program stored in the micro-computer for determining whether the motor is to be stopped, and a H-bridge control circuit, wherein when the motor is stopped at a position which is short of or beyond the commanded stop position, the motor is restarted by increasing progressively the duty $D_t$, i.e. the voltage applied to the motor.

In the stop routine, the voltage applied to the motor, i.e. the duty is given by the following expression which is similar to the aforementioned one (21).

$$D_t = J_n + \theta_n \quad (22)$$

where $J_0 = 0$ $$J_n = J_{n-1} + \delta$$

$\theta_n$ = position error n = 0, 1, 2 ...

$J_0, \ldots, J_n$ = integrals

The suffixes n, n−1 represent the time series, and n represents the current or instant value, while (n−1) represents the preceding value.

Figure 21A:
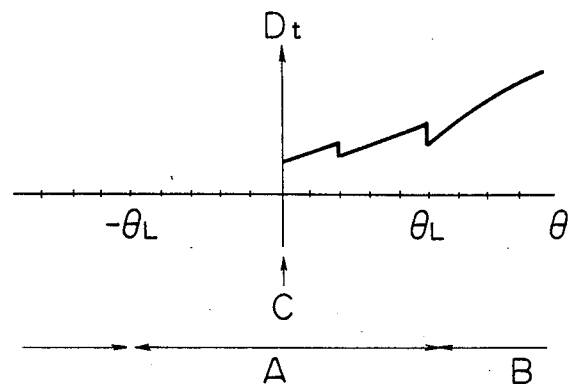
FIG. 21a is a view illustrating variation in duty of voltage applied to the motor in a stop routine.

Referring to FIG. 21a which graphically illustrates the duty $D_t$ given by the expression (22), when the remaining distance $\theta$ is decreased below a predetermined value $\theta_L$ in the speed control region B where the speed control is performed in accordance with $\omega = \sqrt{\alpha \cdot \theta}$, the stop routine A is started, whereupon the duty $D_t$ given by the expression (22) is outputted to the drive circuit. In FIG. 21, C represents the commanded stop position.

More specifically, in the stop routine A, the voltage applied to the motor is increased when the position error $\theta_n$ is large. Upon stoppage of the motor, the integral $J_n$ is incremented by $\delta$, resulting in that the duty $D_t$ is increased. Thus, the motor is eventually caused to stop at the commanded stop position C. At the position C where the position error $\theta_n$ is zero, the duty is set to zero and the power supply source is turned off. The motor is thus held at the stop position.

In brief, when the motor is stopped at a position which is very close to the commanded stop position, the voltage applied to the motor, namely the duty is progressively increased to cause the motor to be moved to the stop position C.

Figure 21B:
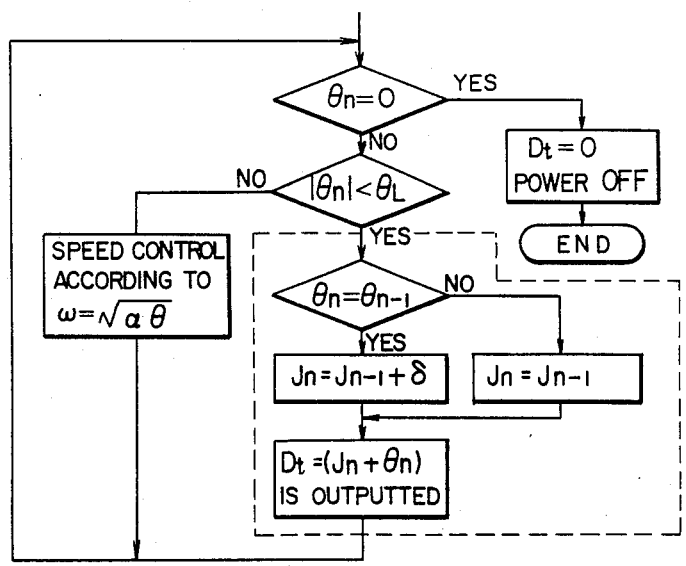
FIG. 21b shows a flow chart for illustrating operations effected in the stop routine.

A flow chart of the stop routine is illustrated in FIG. 21b. Referring to this figure, when the motor is correctly stopped at the commanded stop position C where the position error $\theta_n$ is zero, the duty $D_t$ is reduced to zero and the power supply to the motor is turned off. In case $\theta_n \geq \theta_L$, the speed control in accordance with $\omega = \sqrt{\alpha \cdot \theta}$ is carried out. On the other hand, when $\theta_n < \theta_L$, it is determined whether the current position error $\theta_n$ is equal to the preceding error $\theta_{n-1}$. If so, the integral term $J_{n-1}$ is incremented by $\delta$ because the motor can then be regarded as being stopped. On the other hand, when $\theta_n \neq \theta_{n-1}$, the error $\theta_n$ will eventually be reduced to zero because the motor is then still running. At that time, no integration is effected and $J_n$ is set to $J_{n-1}$, i.e. $J_n = J_{n-1}$. The duty $D_t = J_n + \theta_n$ is outputted. The above process is repeated.

In the assumed case illustrated in FIG. 21b, $J_n$ is set equal to $J_{n-1}$ when $\theta_n = \theta_{n-1}$. However, it is also possible to perform the integration only when the motor is positively stopped. To this end, $J_n$ may be set equal to $J_n - \delta$, i.e. $J_n$ may be decremented by $\delta$ when $\theta_n = \theta_{n-1}$, to the similar effect.

Figure 22:
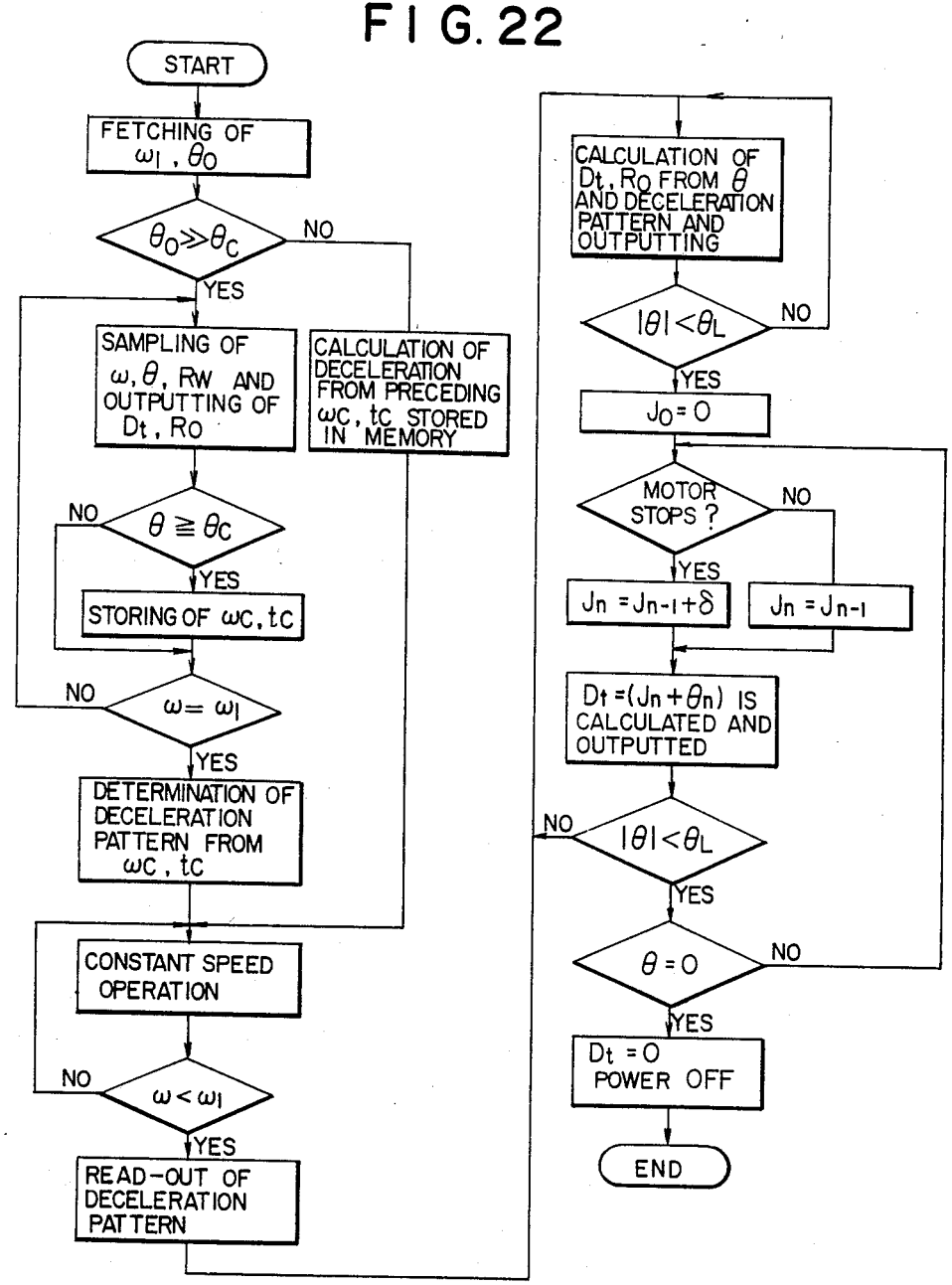
FIG. 22 shows a flow chart for illustrating in more detail the stop routine.

The above briefed operation will be described below in more detail by referring to the flow chart shown in FIG. 22.

At first, the commanded position value $\theta$ and the maximum speed command $\omega_1$ issued by the external apparatus are supplied to the inputs 18 and 19 of the micro-computer 9 shown in FIG. 8 upon activation of the program.

When the motor has attained the maximum command speed $\omega_1$, the reference position value $\theta_c$ related to the distance for which the motor has to run till the stoppage thereof in the decelerating phase is compared with the command position value $\theta_0$. When $\theta_0$ is smaller than $\theta_c$, the deceleration must be initiated before the motor attains the maximum speed command $\omega_1$, since otherwise the deceleration can not be realized without being accompanied with the hunting. For this reason, the processing for the accelerating phase is modified in such a manner as is illustrated in FIG. 22, when $\theta_0 \leq \theta_c$.

On the other hand, when $\theta_0 > \theta_c$, the rotating directon signal $R_W$, the signal indicative of the position tion $\theta$ and the signal indicative of the speed $\omega$ are supplied to the respective inputs 11, 12 and 13 of the micro-computer 9 shown in FIG. 8. The computer 9 then arithmetically determines the duty $D_t$ commanding the voltage applied to the motor. The duty signal $D_t$ is supplied to the drive circuit 8 together with the definite forward-/reverse rotation signal $R_0$ from the micro-computer 9 through the conductors 16 and 17, respectively.

Subsequently, it is determined whether the position signal $\theta$ becomes equal to the reference position tion value $\theta_c$ which is related to the minimum distance mentioned hereinbefore and provides a factor in determining the deceleration characteristic. When $\theta = \theta_c$, the instantaneous speed $\omega_c$ at the reference position $\theta_c$ as well as the time taken for the motor to reach the position $\theta_c$ is stored in RAM of the micro-computer 9, and utilized later on to calculate the acceleration $\alpha$ in accordance with the expression: $\alpha = \omega_c/t_c$.

Next, the speed signal related to the speed $\omega$ is compared with the maximum speed command $\omega_1$. When $\omega < \omega_1$, the speed signal $\omega$, the position signal $\theta$ and the rotating direction signal $R_W$ are again fetched to repeat the process mentioned above.

When the motor speed $\omega$ has reached the maximum speed command $\omega_1$, the speed signal $\omega_c$ and the time $t_c$ stored in the memory are read out to calculate the acceleration $\alpha = \omega_c/t_c$. Further, the maximum speed command $\omega_1$ is compared with the speed signal $\omega$ determined from the acceleration $\alpha$ and the position signal in accordance with $\omega = \sqrt{\alpha \cdot \theta}$. When $\omega < \omega_1$, acceleration may proceed further. When the comparison in that $\omega = \omega_1$, the constant speed operation is then carried out.

Upon entering the decelerating phase, the motor is then decelerated in accordance with a deceleration pattern. In this connection, when $\theta_c < \theta_c$, a previously established pattern is adopted in the current decelerating phase. Namely, the deceleration pattern previously calculated and stored in the memory is read out, and the duty $D_t$ as well as the forward/reverse rotation signal $R_0$ is determined from the position signal $\theta$ and the relevant speed signal $\omega(=\sqrt{\alpha \cdot \theta})$ to be outputted to the drive circuit.

Next, decision is made as to whether the motor position $\theta$ has attained the position $\theta_L$ which allows the motor control to enter the stop routine. If not, the deceleration in accordance with the deceleration pattern is continued. Otherwise, the stop routine is entered.

In the stop routine, the initial value $J_0$ of the integral term is first cleared. Subsequently, it is checked whether or not the motor is stopped. When the motor is not stopped, the integral term $J_n$ is left as it is. On the other hand, the integral term $J_n$ is increased by $\delta$, i.e. $J_n = J_{n-1} + \delta$, when the motor is stopped.

The value of $\delta$ is determined in depenence on the time required for adding $\delta$ to (the integration time) and the acceleration $\alpha$ of the motor. In practice, $\delta$ is 1, 2 or so.

Then, the duty $D_t = J_n$ (integral term) $+ \theta_n$ (position error) is outputted. Decision is again made as to whether the motor position $\theta$ becomes close to the position $\theta_L$. When the motor position is much deviated from the commanded stop position, the speed control according to the deceleration pattern is regained. On the other hand, when $\theta$ is close to $\theta_L$, decision is made as to whether or not $\theta_n = 0$. When $\theta_n = 0$, this means that the motor is at the commanded stop position. Then, the duty $D_t$ is reduced to zero. The speed control cycle thus comes to an end. Unless $\theta_n = 0$, the integrating operation is repeated.

It will now be understood in what manner the present invention is implemented and put into operation to accomplish the aimed objects.

In the foregoing description, it has been assumed that the rotation angle detector has been employed. It will however be appreciated that the detector may be replaced by such a detector which is designed to detect a rectilinear distance, a curvilinear distance or others without departing from the scope of the present invention.

What is claimed is:

1. A method of controlling a position of an electric motor with the aid of a rotation angle detector for detecting a rotation angle of a rotating shaft of said motor or a rotating shaft constituting a part of a power transmission path for operatively coupling said rotating shaft of said motor to an apparatus constituting a load, said rotation angle detector providing signals representative of the rotation angle and a rotating speed of said rotating shaft, and a control circuit for controlling said motor so that said motor is positioned at a given position in accordance with a position command signal issued to said motor in consideration of said rotation angle and said rotating speed, wherein a control process activated upon starting of said motor in response to said position command signal and ending upon stoppage of said motor at a position designated by said position command signal includes a first control region in which at least acceleration of said motor in an accelerating phase thereof is detected and subsequently a constant speed operation of said motor is effected at a maximum speed, a deceleration initiating time point determined on the basis of said acceleration, a second control region in which said motor is decelerated from said deceleration initiating time point in accordance with a deceleration pattern which is determined in dependence on a rotation angle between the deceleration initiating position and the commanded stop position, torque of said motor and magnitude of inertia of said load detected at the time point at which said deceleration is initiated, and a fifth control region in which said motor is held at the stop position designated by said position command signal.

2. A method of controlling a position of an electric motor according to claim 1, wherein there is interposed between said second control region and said fifth control region a second control region in which operation of said motor is controlled by progressively reducing a gain of an apparatus for energizing said motor.

3. An apparatus for controlling a position of an electric motor, comprising a rotation angle detector for detecting a rotation angle of a rotating shaft of said motor or a rotating shaft constituting a part of a power transmission path for operatively coupling said rotating shaft of said motor to an apparatus constituting a load, said rotation angle detector providing signals representative of the rotation angle and a rotating speed of said rotating shaft, and a control system for controlling said motor so that said motor is positioned at a given position in accordance with a position command signal issued to said motor in consideration of said rotating speed, wherein a control process activated upon starting of said motor in response to said position command signal and ending upon stoppage of said motor at a position designated by said position command signal includes a control region in which said motor is held at the stop position designated by said position command signal, said control system being further so arranged as to output a duty for generating in said motor a torque of such magnitude and direction as to cancel a cogging torque of said motor for holding said motor at the commanded position in said control region.

4. An apparatus for controlling a position of an electric motor, comprising a rotation angle detector for detecting a rotation angle of a rotating shaft of said motor or a rotating shaft constituting a part of a power transmission path for operatively coupling said rotating shaft of said motor to an apparatus constituting a load, said rotation angle detector providing signals representative of the rotation angle and a rotating speed of said rotating shaft, and a control circuit for controlling said motor so that said motor is positioned at a given position in accordance with a position command signal issued to said motor in consideration of said rotating speed, wherein a control process activated upon starting of said motor in response to said position command signal and ending upon stoppage of said motor at a position designated by said position command signal includes a control region in which when said motor is stopped short of or beyond the stop position designated by said position command signal, and wherein a duty ratio determined by said control circuit is progressively increased to thereby re-start said motor toward said stop position designated by said position command signal.

5. An apparatus for controlling a position of an electric motor, comprising a rotation angle detector for detecting a rotation angle of a rotating shaft of said motor or a rotating shaft constituting a part of a power transmission path for operatively coupling said rotating shaft of said motor to an apparatus constituting a load, said rotation angle detector providing signals representative of the rotation angle and a rotating speed of said rotating shaft, and a control system for controlling said motor so that said motor is positioned at a given position in accordance with a position command signal issued to said motor in consideration of said rotating speed, said control system including a control circuit capable of applying a variable voltage of positive or negative polarity to said motor, said control circuit including a circuit for fetching a given positioning command, a circuit for deriving the motor speed signal and the motor position signal from the output signal of said rotation angle detector, a micro-computer for arithmetically processing said speed signal and said position signal, a program stored in said micro-computer for deciding whether said motor is to be stopped, and a H-control circuit, wherein when said motor is stopped at a position which is short of or beyond said commanded stop position, the motor is restarted by increasing progressively the voltage applied to the motor.

6. An apparatus for controlling a position of an electric motor according to claim 2, wherein there is interposed between said third and fifth control region of a fourth control region in which when said motor is stopped short of or beyond the stop position designated by said position command signal, and wherein a duty ratio determined by said control circuit is progressively increased to thereby re-start said motor toward said stop position designated by said position command signal.

* * * * *